(12) United States Patent
Chan et al.

(10) Patent No.: US 10,304,155 B2
(45) Date of Patent: May 28, 2019

(54) DELTA COLOR COMPRESSION APPLICATION TO VIDEO

(71) Applicants: Advanced Micro Devices, Inc., Sunnyvale, CA (US); ATI Technologies ULC, Markham (CA)

(72) Inventors: Anthony Chan, Richmond Hill (CA); Christopher J. Brennan, Holden, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 87 days.

(21) Appl. No.: 15/442,383

(22) Filed: Feb. 24, 2017

(65) Prior Publication Data
US 2018/0247388 A1 Aug. 30, 2018

(51) Int. Cl.
  *G06T 1/60* (2006.01)
  *H04L 9/08* (2006.01)
  *H04N 19/176* (2014.01)
  *H04N 19/70* (2014.01)

(52) U.S. Cl.
  CPC .............. *G06T 1/60* (2013.01); *H04L 9/0861* (2013.01); *H04N 19/176* (2014.11); *H04N 19/70* (2014.11)

(58) Field of Classification Search
  CPC ........................................................ G06T 1/60
  USPC ................................................. 345/530, 555
  See application file for complete search history.

(56) References Cited

U.S. PATENT DOCUMENTS

| | | | |
|---|---|---|---|
| 5,548,751 | A | 8/1996 | Ryu et al. |
| 5,946,716 | A | 8/1999 | Karp et al. |
| 6,553,457 | B1 | 4/2003 | Wilkins et al. |
| 6,728,722 | B1 | 4/2004 | Shaylor |
| 7,068,192 | B1 | 6/2006 | Dean et al. |
| 7,962,727 | B2 | 6/2011 | Frank |

(Continued)

FOREIGN PATENT DOCUMENTS

| | | |
|---|---|---|
| EP | 1465418 A1 | 10/2004 |
| WO | 2013072889 A1 | 5/2013 |

OTHER PUBLICATIONS

Communication pursuant to Article 94(3) EPC in European Application No. 17159108.4, dated Apr. 13, 2018, 8 pages.

(Continued)

*Primary Examiner* — Jacinta M Crawford
(74) *Attorney, Agent, or Firm* — Meyertons Hood Kivlin Kowert and Goetzel PC; Rory D. Rankin

(57) ABSTRACT

Systems, apparatuses, and methods for compressing pixel data are disclosed. In one embodiment, if a block of pixel data is equal to a constant value, a processor compresses the block down to a metadata value which specifies the constant value for the entire block of pixel data. The processor also detects if the constant value is equal to a video specific typical minimum or maximum value. In another embodiment, the processor receives a plurality of M-bit pixel components which are most significant bit aligned in N-bit containers. Next, the processor shifts the M-bit pixel components down into least significant bit locations of the N-bit containers. Then, the processor converts the N-bit containers into M-bit containers. Next, the processor compresses the M-bit containers to create a compressed block of pixel data which is then stored in a memory subsystem.

20 Claims, 9 Drawing Sheets

(56) References Cited

U.S. PATENT DOCUMENTS

| | | | | |
|---|---|---|---|---|
| 8,705,635 | B2* | 4/2014 | Lee | G06T 9/00 375/240.23 |
| 2007/0274382 | A1* | 11/2007 | Hickey | H03M 7/40 375/240.03 |
| 2008/0068231 | A1 | 3/2008 | Kuhns | |
| 2011/0238914 | A1* | 9/2011 | Hirayama | H03M 7/30 711/118 |
| 2014/0098111 | A1* | 4/2014 | Ju | H04N 19/127 345/502 |
| 2014/0184612 | A1 | 7/2014 | Dunaisky et al. | |
| 2016/0119621 | A1* | 4/2016 | Lin | H04N 19/172 382/166 |
| 2018/0020232 | A1* | 1/2018 | Saeedi | H04N 19/176 |

OTHER PUBLICATIONS

Communication pursuant to Article 84(3) EPC in European Application No. 17159108.4, dated Oct. 13, 2017, 6 pages.
Kim et al., "Bit-Plane Compression: Transforming Data for Better Compression in Many-core Architectures", Proceedings of the 43rd International Symposium on Computer Architecture, Jun. 18, 2016, pp. 329-340, vol. 44, No. 3.
Communication pursuant to Article 94(3) EPC in European Application No. 17159108.4, dated Sep. 19, 2018, 7 pages.

* cited by examiner

400

| Pixel Color | 8-bit Encoding Value (Y,C) 410 | Bit Representation of Y Component 415 | Bit Representation of C Component 417 |
|---|---|---|---|
| Black | 16, 128 | 0b00010000 | 0b10000000 |
| White | 235, 128 | 0b11101011 | 0b10000000 |

420

| Pixel Color | 10-bit Encoding Value (Y, C) 430 | Bit Representation of Y Component 435 | Bit Representation of C Component 437 |
|---|---|---|---|
| Black | 64, 512 | 0b0001000000 | 0b1000000000 |
| White | 940, 512 | 0b1110101100 | 0b1000000000 |

FIG. 4

DELTA COLOR COMPRESSION APPLICATION TO VIDEO

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. The GPU can be a discrete device or can be included in the same device as another processor, such as a central processing unit (CPU). A GPU produces the pixels that make up an image from a higher level description of its components in a process known as rendering. GPUs typically utilize a concept of continuous rendering by the use of computing elements to process pixel, texture, and geometric data. The computing elements can execute the functions of rasterizers, setup engines, color blenders, hidden surface removal, texture mapping, etc. These computing elements are often referred to as shaders, shader processors, shader arrays, shader units, shader engines, etc., with "shader" being a term in computer graphics referring to a set of software instructions or a program used by a graphics resource to perform rendering effects. "Shader" can also refer to an actual hardware component or processor used to execute software instructions. A shader processor or program can read and render data and perform any type of processing of the data.

Much of the processing involved in generating complex graphics scenes involves texture data. Textures can be any of various types of data, such as color, transparency, lookup tables, or other data. In some embodiments, textures can be digitized images to be drawn onto geometric shapes to add visual detail. A large amount of detail, through the use of textures, can be mapped to the surface of a graphical model as the model is rendered to create a destination image. The purpose of texture mapping is to provide a realistic appearance on the surface of objects. Textures can specify many properties, including colors, surface properties like specular reflection or fine surface details in the form of normal or bump maps. A texture can also be image data, color or transparency data, roughness/smoothness data, reflectivity data, etc.

In textures and surfaces, the smallest item of information is referred to as a "pixel." For convenience, pixels are generally arranged in a regular two-dimensional grid. By using such an arrangement, many common operations can be implemented by uniformly applying the same operation to each pixel independently. To represent a specific color, each pixel can have three values, one each for the amounts of red, green, and blue present in the desired color. Some pixel formats can also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr). Each separate value of a source pixel can be referred to as a "pixel component" (e.g., red pixel component, blue pixel component, blue-difference chroma pixel component, luma pixel component) herein.

In 3D computer graphics, surface detail on objects is commonly added through the use of textures. For example, a 2D bitmap image of a brick wall can be applied, using texture mapping, to a set of polygons representing a 3D model of a building to give the 3D rendering of that object the appearance that it is made of bricks. Providing realistic computer graphics typically requires many high-quality, detailed textures. The use of textures can consume large amounts of storage space and bandwidth, and consequently textures can be compressed to reduce storage space and bandwidth utilization.

Compressing textures and surfaces can reduce storage and bandwidth costs on the graphics system while retaining as much of the quality of the original textures and surfaces as possible. One of the limitations of graphics processing is that memory or cache bandwidth is preventing the GPU from reaching its full capabilities. Compression can be utilized to decrease the amount of data fetched from memory or cache for processing by the GPU. However, the existing types of compression are not well suited for compressing textures and surfaces being processed by the GPU.

BRIEF DESCRIPTION OF THE DRAWINGS

The advantages of the methods and mechanisms described herein may be better understood by referring to the following description in conjunction with the accompanying drawings, in which:

FIG. 4 illustrates two tables specifying the encoding values for black and white pixel values.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for compressing pixel data are disclosed herein. In one embodiment, a system includes at least a processor coupled to a memory subsystem. The memory subsystem includes one or more levels of cache and/or one or more memories. In one embodiment, the processor is configured to receive a plurality of M-bit pixel components which are most significant bit (MSB) aligned in N-bit containers, wherein N and M are integers, and wherein N is greater than M. Next, the processor shifts the M-bit pixel components down into least significant bits (LSB) locations of the N-bit containers. Then, the processor converts the plurality of N-bit containers into a plurality of M-bit containers. Next, the processor compresses the plurality of M-bit containers to create a compressed block of pixel data. Then, the processor stores the compressed block of pixel data in the memory subsystem.

In response to receiving a request to decompress the compressed block of pixel data stored in the memory subsystem, the processor is configured to retrieve the compressed block of pixel data. Next, the processor decompresses the compressed block of pixel data to create pixel components in M-bit containers. Then, the processor expands the M-bit containers into N-bit containers. Next, the processor shifts the M-bit pixel components to MSB locations of the N-bit containers. Then, the processor conveys the pixel components in N-bit containers to a client (e.g., shader).

Figure 1:
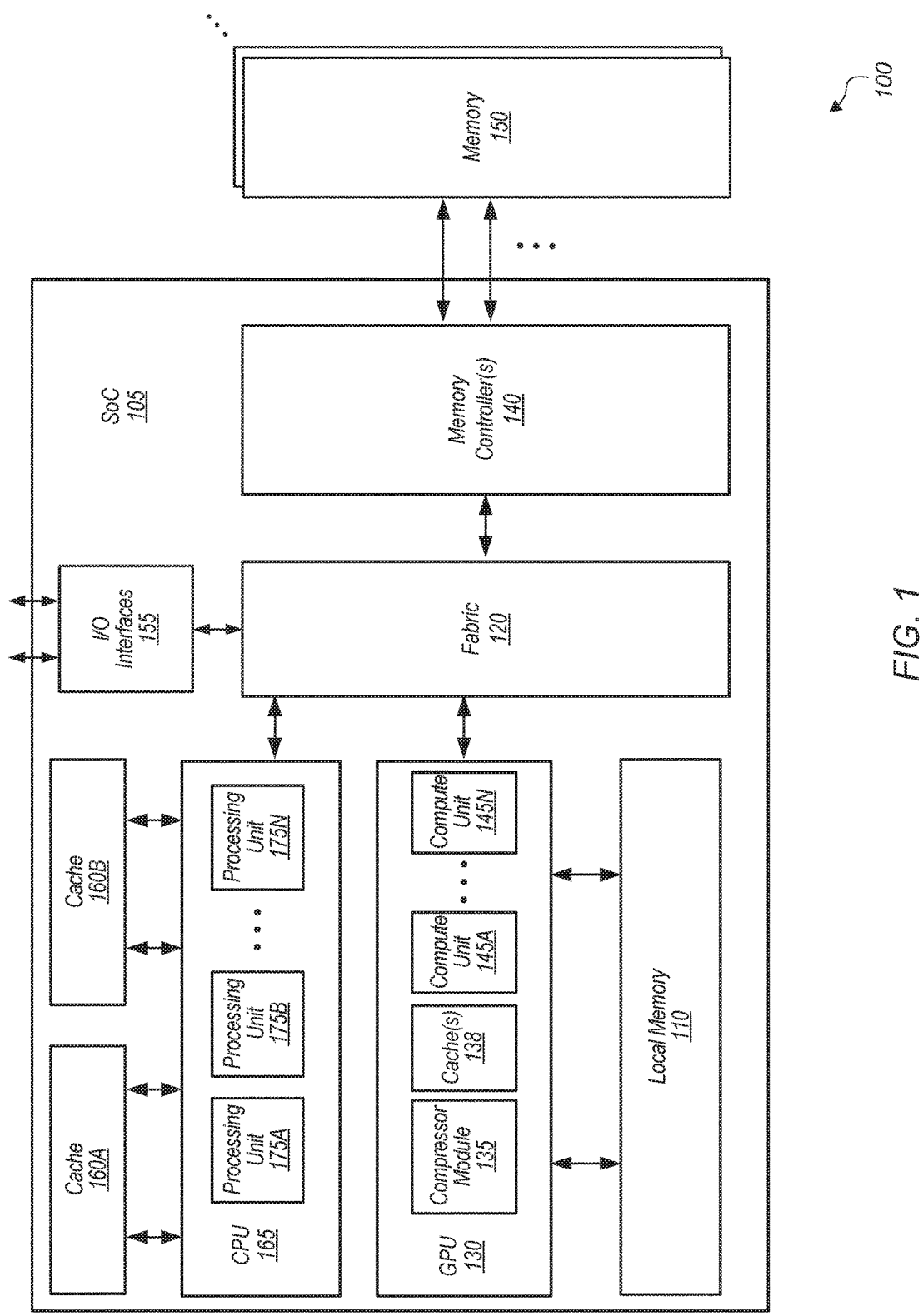
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 175A-N of central processing unit (CPU) 165, input/output (I/O) interfaces 155, caches 160A-B, fabric 120, graphics processing unit (GPU) 130, local memory 110, and memory controller(s) 140. SoC 105 can also include other components not shown in FIG. 1 to avoid obscuring the figure. Processing units 175A-N are representative of any number and type of processing units. In one embodiment, processing units 175A-N are CPU cores. In another embodiment, one or more of processing units 175A-N are other types of processing units (e.g., application specific integrated circuit (ASIC), field programmable gate array (FPGA), digital signal processor (DSP)). Processing units 175A-N of CPU 165 are coupled to caches 160A-B and fabric 120.

In one embodiment, processing units 175A-N are configured to execute instructions of a particular instruction set architecture (ISA). Each processing unit 175A-N includes one or more execution units, cache memories, schedulers, branch prediction circuits, and so forth. In one embodiment, the processing units 175A-N are configured to execute the main control software of system 100, such as an operating system. Generally, software executed by processing units 175A-N during use can control the other components of system 100 to realize the desired functionality of system 100. Processing units 175A-N can also execute other software, such as application programs.

GPU 130 includes at least compressor module 135, cache(s) 138, and compute units 145A-N. It is noted that compressor module 135 can also be referred to as a "compression module" or a "compression unit". Compute units 145A-N are representative of any number and type of compute units that are used for graphics or general-purpose processing. Each compute unit 145A-N includes any number of execution units, with the number of execution units per compute unit varying from embodiment to embodiment. GPU 130 is coupled to local memory 110 and fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 is configured to receive a plurality of M-bit pixel components which are most significant bit (MSB) aligned in N-bit containers, wherein N and M are integers, and wherein N is greater than M. After receiving the plurality of M-bit pixel components, GPU 130 shifts the M-bit pixel components down into least significant bits (LSB) locations of the N-bit containers. Then, GPU 130 converts the plurality of N-bit containers into a plurality of M-bit containers. Next, GPU 130 compresses the plurality of M-bit containers to create a compressed block of pixel data. Then, GPU 130 stores the compressed block of pixel data to local memory 110.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 175A-N and/or compute units 145A-N. In some embodiments, SoC 105 includes caches 160A-B that are utilized by processing units 175A-N. In one embodiment, caches 160A-B are part of a cache subsystem including a cache controller.

It is noted that the letter "N" when displayed herein next to various structures is meant to generically indicate any number of elements for that structure (e.g., any number of processing units 175A-N in CPU 165, including one processing unit). Additionally, different references within FIG. 1 that use the letter "N" (e.g., compute units 145A-N) are not intended to indicate that equal numbers of the different elements are provided (e.g., the number of processing units 175A-N in CPU 165 can differ from the number of compute units 145A-N of GPU 130).

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
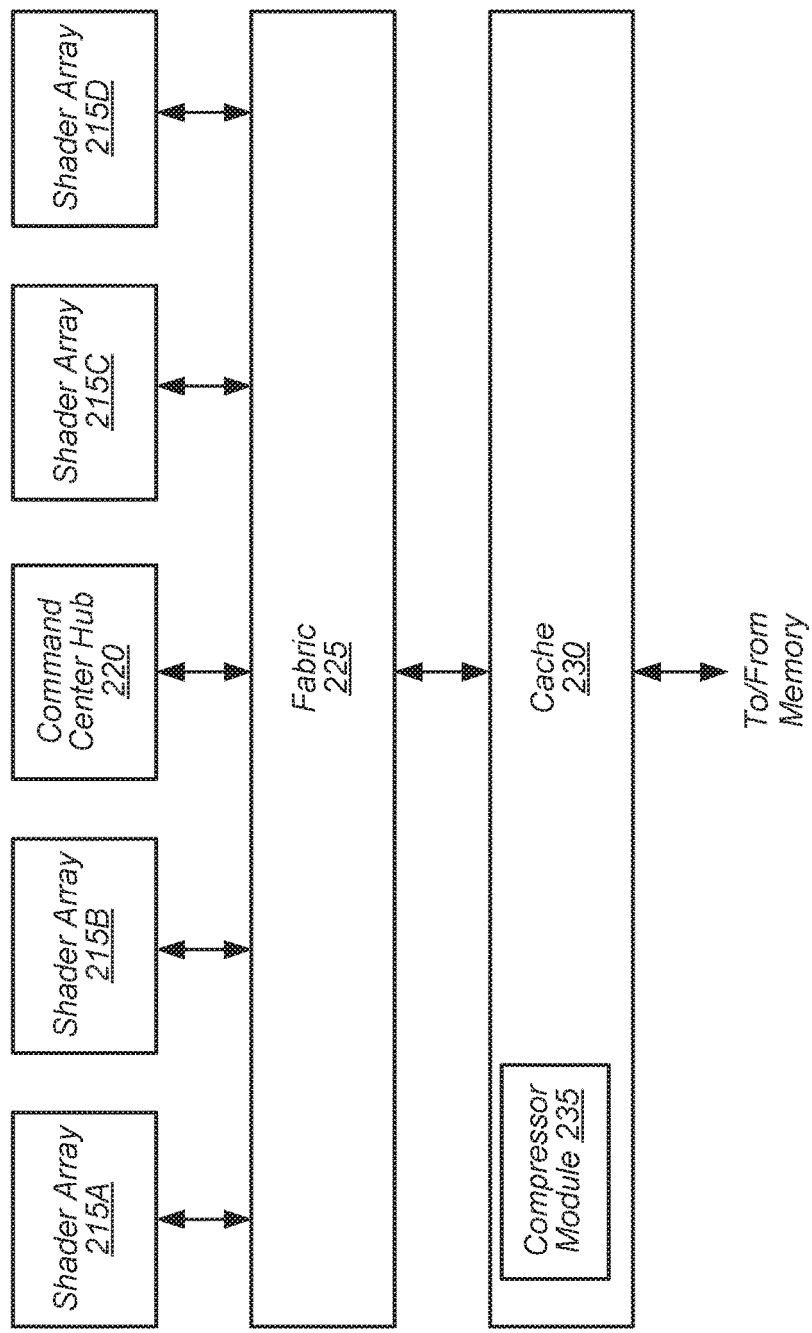
FIG. 2 is a block diagram of one embodiment of a graphics processing unit (GPU).

Turning now to FIG. 2, a block diagram of one embodiment of a graphics processing unit (GPU) 200 is shown. In one embodiment, the logic of GPU 200 is included in GPU 130 (of FIG. 1). In one embodiment, GPU 200 includes at least shader arrays 215A-D, command center hub 220, fabric 225, and cache 230. It is noted that GPU 200 also includes other logic and/or other components which are not shown in FIG. 2 to avoid obscuring the figure. It is also noted that the structure of GPU 200 is merely one example of a structure which is used in one embodiment. In other embodiments, GPU 200 can be organized in other manners.

Shader arrays 215A-D are representative of any number and type of shader compute resources which are included in GPU 200. Shader arrays 215A-D can also be referred to as "shader units". Each shader array 215A-D includes various compute resources for performing geometry, vertex, pixel, and/or other shading operations to render graphics. In various embodiments, the compute resources include components for fetching and decoding instructions, one or more arithmetic logic units "ALUs" for performing arithmetic calculations, and other resources. Although not shown in FIG. 2, each shader array 215A-D can include a level one (L1) cache. Shader arrays 215A-D are coupled to cache 230 via fabric 225. In one embodiment, cache 230 is a level two (L2) cache. Depending on the embodiment, cache 230 is coupled to a memory (not shown) or another level of cache (not shown). Command center hub 220 is representative of any number and type of command processors, schedulers, and other command processing resources.

In one embodiment, compressor module 235 is located within cache 230. In another embodiment, compressor module 235 is located within fabric 225. In one embodiment, when GPU 200 receives pixel data, compressor module 230 is configured to compress the pixel data using delta color compression (DCC). Then, the compressed data is written to cache 230. In one embodiment, compressor module 230 is configured to decompress the compressed data and convey the decompressed data to a client (e.g., shader arrays 215A-D).

Figure 3:
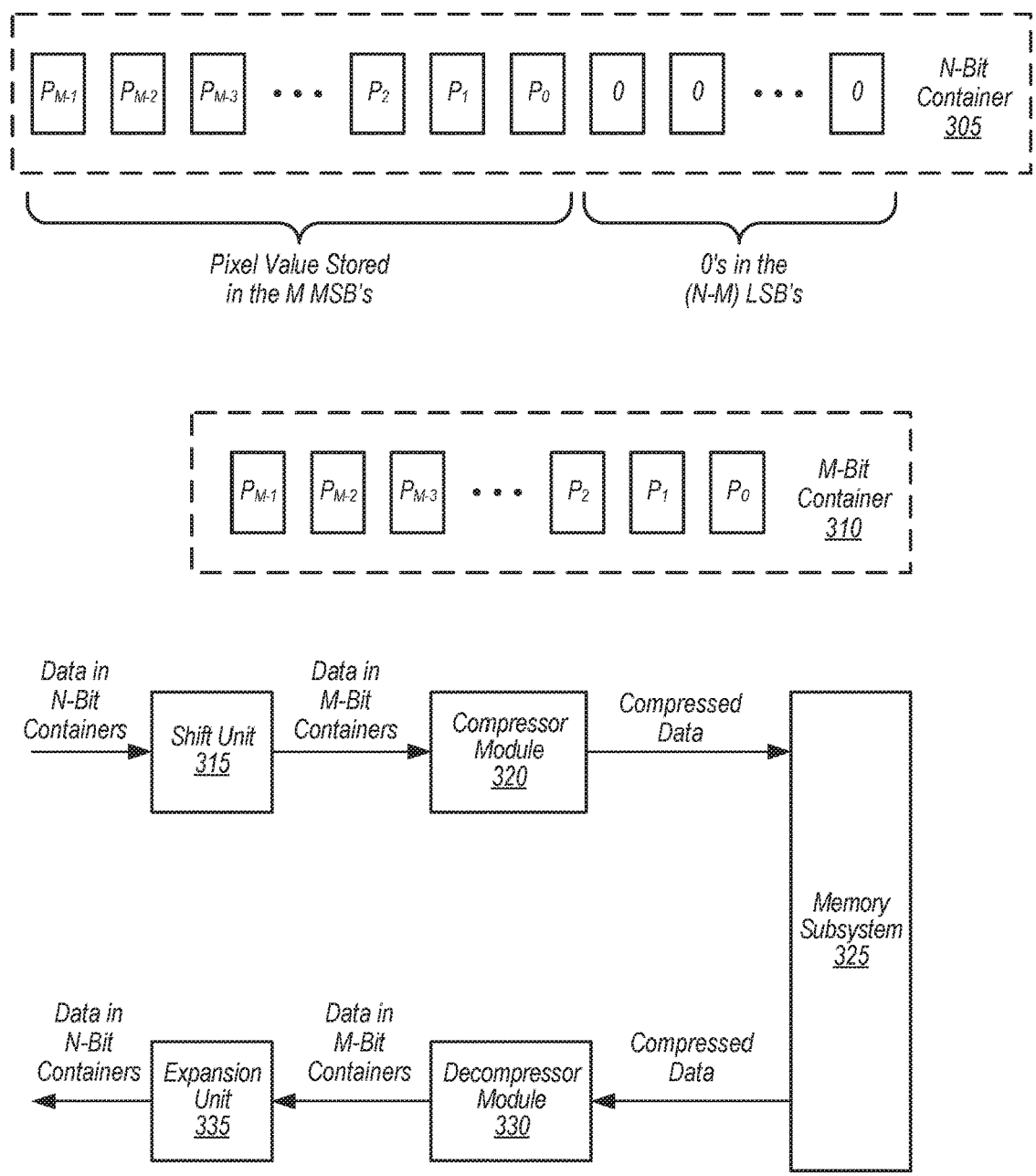
FIG. 3 is a block diagram of one embodiment of a technique for compressing pixel data.

Referring now to FIG. 3, a block diagram of one embodiment of a technique for compressing pixel data is shown. In one embodiment, a processor receives M-bit pixel data which is most significant bit (MSB)-aligned in N-bit containers. It is assumed for the purposes of this discussion that N and M are integers and that N is greater than M. This is illustrated in N-bit container 305 at the top of FIG. 3. As used herein, a container is defined as a plurality of storage locations, with the storage locations implemented with any suitable type of storage element (e.g., register, memory, cache, processing lane), with the type of storage element varying from embodiment to embodiment. As shown, each bit of the pixel value ($P_{M-1}$, $P_{M-2}$, etc.) is shown within the MSB locations of N-bit container 305. Also, the least significant bits (LSBs) of N-bit container 305 are all 0 bits. For example, in one embodiment, N is equal to 16 and M is equal to 10, with the 10-bit pixel values stored in the upper 10 bits of the 16-bit container, and with the lower 6 bits being equal to 0.

Prior to compressing N-bit container 305, the pixel data in N-bit container 305 is shifted down to the LSB's of M-bit container 310. Alternatively, the 0's in the LSB's of N-bit container 305 are dropped to generate M-bit container 310.

Then, when the pixel data in M-bit containers 310 is compressed using DCC, the delta value between adjacent pixels will be reduced, resulting in the pixel data being compressed with a higher compression ratio than if the pixel data in N-bit containers 305 were compressed.

An example block diagram of a scheme for compressing N-bit containers with M-bit pixel data is shown at the bottom of FIG. 3. The pixel data in N-bit containers is received by the processor and coupled to shift unit 315. Shift unit 315 converts the data in N-bit containers to data in M-bit containers. Then, the data in M-bit containers are coupled as inputs to compressor module 320. Compressor module 320 is configured to utilize DCC for compressing the data in M-bit containers, and then compressor module 320 writes the compressed data to memory subsystem 325. Memory subsystem 325 includes any number of cache levels and/or memory devices.

Then, decompressor module 330 retrieves the compressed data from memory subsystem 325 and decompresses the compressed data to generate data in M-bit containers. Next, expansion unit 335 can expand the data in M-bit containers to create the data in N-bit containers. The data in N-bit containers is then conveyed to the client (e.g., shader). It is noted that the shift unit 315, compressor module 320, decompressor module 330, and expansion unit 335 can be implemented using any suitable combination of hardware and/or software. It is also noted that the shift unit 315, compressor module 320, decompressor module 330, and expansion unit 335 can be combined together or implemented separately, depending on the embodiment.

Turning now to FIG. 4, two tables specifying the encoding values for black and white pixel values are shown. In one embodiment, the encoding values used to represent black in a given pixel component in the Y, Cb, Cr components of a YCbCr color space are not the lowest possible values in the number representation. Rather, the encoding values used to represent black for the Y, Cb, Cr components are non-zero values. Also, the encoding values used to represent white are not the highest possible values in the number representation. For example, table 400 shows the 8-bit encoding values 410 and the corresponding bit representations 415 and 417 used to represent black and white pixel values for Y and C (Cb and Cr) components, respectively. Black is represented by 16 in the Y component and 128 in the C components for 8-bit encoding values with the corresponding bit representations shown in columns 415 and 417. Also, white is represented by 235 in the Y component and 128 in the C components for 8-bit encoding values with the corresponding bit representations shown in column 415 and 417. If a compressor module detects a block of data includes only black pixels, the processor generates a first metadata key to indicate the block only includes black pixels, and then the processor discards the block of data while storing only the first metadata key. If the compressor module detects a block of data includes only white pixels, the processor generates a second metadata key to indicate the block only includes black pixels, and then the processor discards the block of data while storing only the second metadata key.

Table 420 shows the 10-bit encoding values 430 and corresponding bit representations 435 and 437 for the black and white values. The 10-bit encoding value 430 for black is 64 for the Y component and 512 for the C components, with the corresponding bit representations shown in columns 435 and 437. The 10-bit encoding value 430 for white is 940 for the Y component and 512 for the C components, with the corresponding bit representations shown in columns 435 and 437. It is noted that other embodiments can utilize other numbers of bits for each encoding value, with the values used to represent black and white following the same pattern illustrated for 8-bit and 10-bit representations. It is also noted that a compressor module (e.g., compressor module 135 of FIG. 1) is configured to determine if pixel values match the special black and white values. If all of the pixel components of a given block of data are equal to the black or the white value, the compressor module compresses the entire block of data and then generates a metadata key which indicates which value (block or white) was detected for the block of data.

Figure 5:
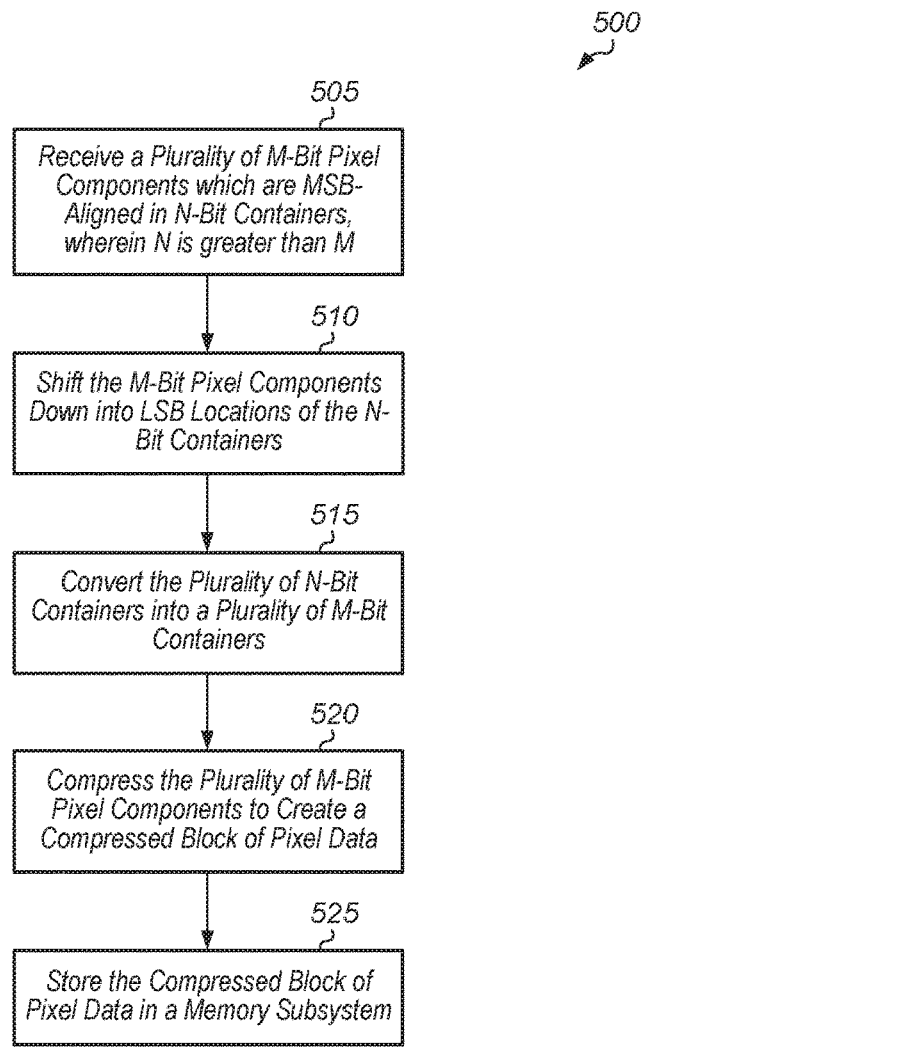
FIG. 5 is a generalized flow diagram illustrating one embodiment of a method for compressing pixel data.

Referring now to FIG. 5, one embodiment of a method 500 for compressing video pixel data is shown. For purposes of discussion, the steps in this embodiment and those of FIGS. 6-9 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A processor receives a plurality of M-bit pixel components which are most significant bit (MSB) aligned in N-bit containers, wherein N and M are integers, and wherein N is greater than M (block 505). In one embodiment, the processor includes a compressor module, and the processor is coupled to a cache and/or a memory. Next, the processor shifts the M-bit pixel components down into least significant bits (LSB) locations of the N-bit containers (block 510). Then, the processor converts the plurality of N-bit containers into a plurality of M-bit containers (block 515). In another embodiment, the processor discards the (N-M) least significant bits (LSB) of each pixel component in the N-bit containers to create a plurality of M-bit containers. Next, the processor compresses the plurality of M-bit pixel components to create a compressed block of pixel data (block 520). Then, the processor stores the compressed block of pixel data in the memory subsystem (block 525). After block 525, method 500 ends.

Figure 6:
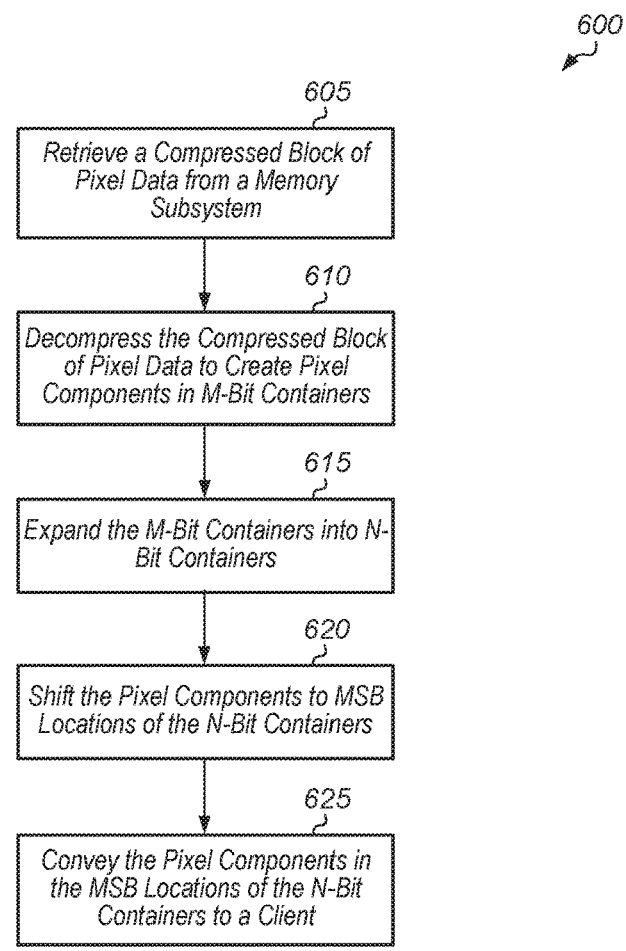
FIG. 6 is a generalized flow diagram illustrating one embodiment of a method for decompressing a block of compressed pixel data.

Turning now to FIG. 6, one embodiment of a method 600 for decompressing a block of compressed pixel data is shown. A processor retrieves a compressed block of pixel data from a memory subsystem (block 605). In one embodiment, the processor includes a compressor module, and the memory subsystem includes one or more levels of cache and/or one or more memories. Next, the processor decompresses the compressed block of pixel data to create pixel components in M-bit containers (block 610). Then, the processor expands the M-bit containers into N-bit containers (block 615). Next, the processor shifts the pixel components to MSB locations of the N-bit containers (block 620). Then, the processor conveys the pixel components in the MSB locations of the N-bit containers to a client (block 625). In one embodiment, the client is a shader. After block 625, method 600 ends.

Figure 7:
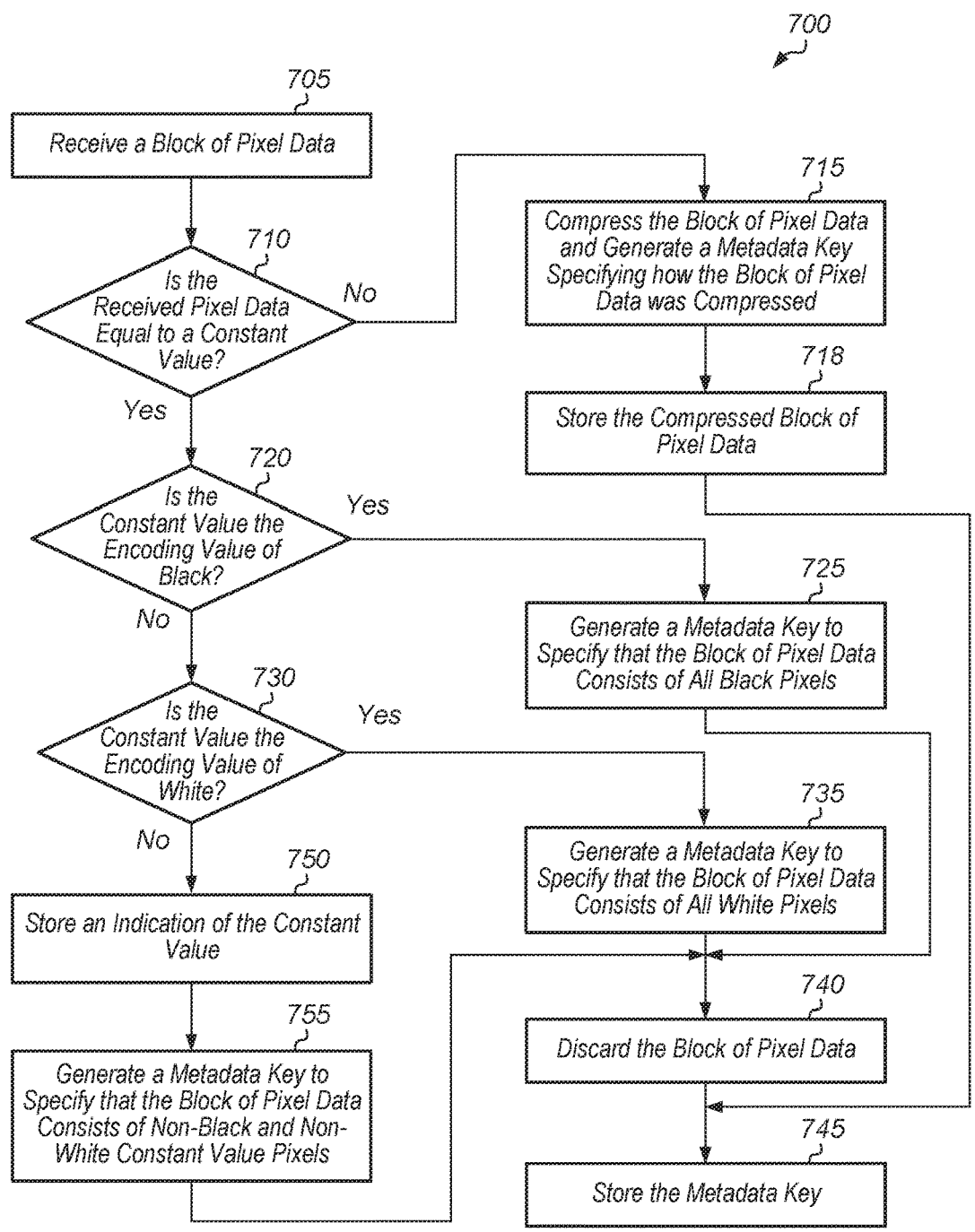
FIG. 7 is a generalized flow diagram illustrating one embodiment of a method for compressing constant pixel data.

Referring now to FIG. 7, one embodiment of a method 700 for compressing constant pixel data is shown. A compressor module receives a block of pixel data (block 705). The compressor module is implemented with any suitable combination of hardware and/or software. In one embodiment, the compressor module is configured to receive blocks of data of a fixed size. In one embodiment, the fixed size is 256 bytes. In other embodiments, the fixed size can include other amounts of data. Next, the compressor module determines if the received pixel data is equal to a constant value (conditional block 710).

If the received pixel data is equal to a constant value (conditional block 710, "yes" leg), then the compressor module determines if the constant value is equal to the encoding value of black (conditional block 720). The encoding value of black is shown in tables 400 and 420 (of FIG. 4) for two different embodiments. If the received pixel data is not equal to a constant value (conditional block 710, "no" leg), then the compressor module compresses the block of pixel data and generates a metadata key specifying how the block of pixel data was compressed (block 715). Next, the compressor module stores the compressed block of data (block 718). Then, the compressor module stores the metadata key (block 745). After block 745, method 700 ends.

If the constant value is equal to the encoding value of black (conditional block 720, "yes" leg), then the compressor module generates a metadata key to indicate that the block of data consists of all black pixels (block 725). Then, the compressor module discards the block of pixel data (block 740) and stores the metadata key (block 745). If constant value is not equal to the encoding value of black (conditional block 720, "no" leg), then the compressor module determines if the constant value is equal to the encoding value of white (conditional block 730). The encoding value of white is shown in tables 400 and 420 for two different embodiments. If the constant value is equal to the encoding value of white (conditional block 730, "yes" leg), then the compressor module generates a metadata key to indicate that the block of data consists of all white pixels (block 735). Then, the compressor module discards the block of pixel data (block 740) and stores the metadata key (block 745).

If the constant value is not equal to the special encoding value of white (conditional block 730, "no" leg), then the compressor module stores an indication of the constant value (block 750). In one embodiment, the constant value is stored in a register. Next, the compressor module generates a metadata key to specify that the block of pixel data consists of non-block and non-white constant value pixels (block 755). After block 755, the compressor module discards the block of pixel data (block 740) and stores the metadata key (block 745).

Figure 8:
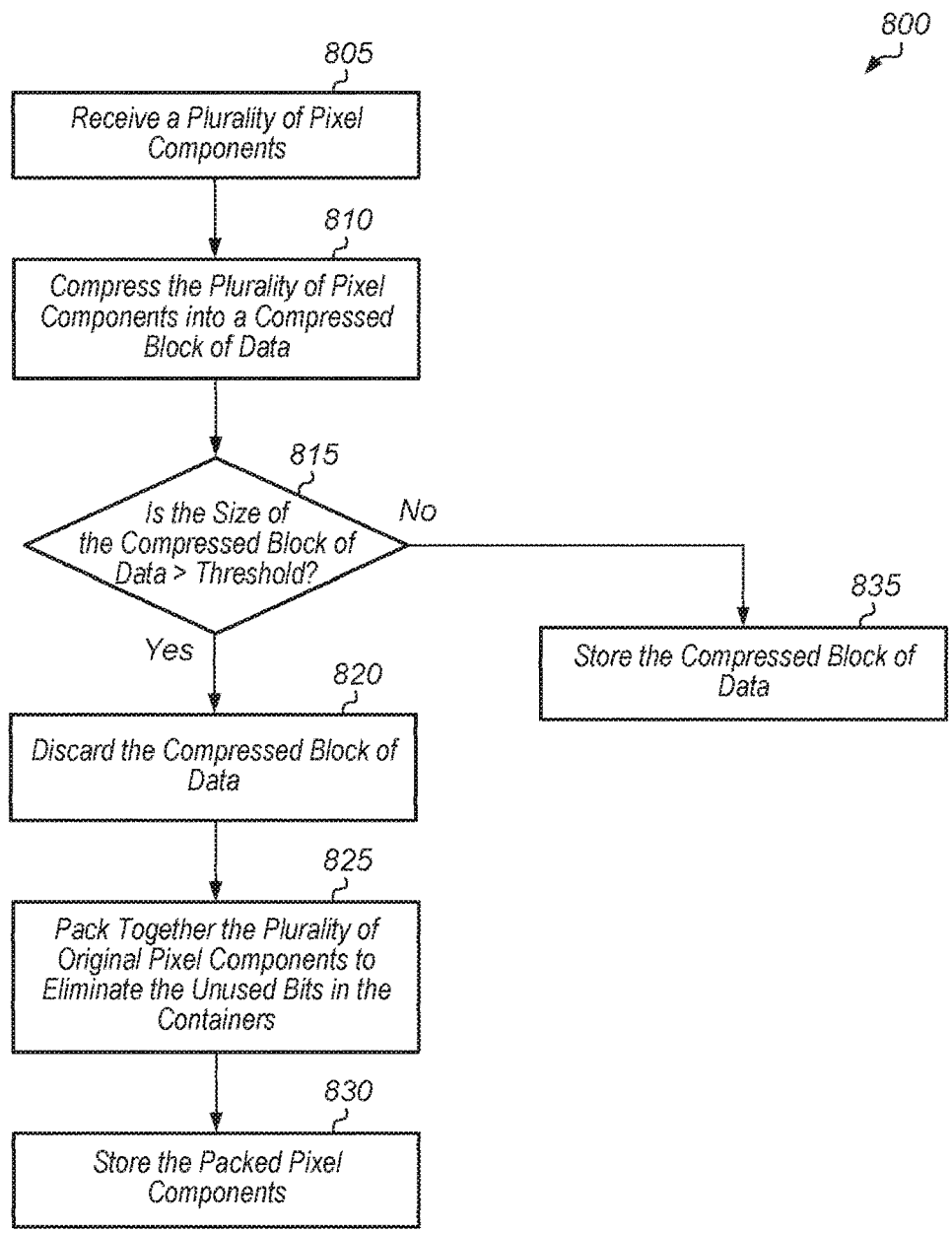
FIG. 8 is a generalized flow diagram illustrating another embodiment of a method for compressing pixel data.

Turning now to FIG. 8, another embodiment of a method 800 for compressing pixel data is shown. A compressor module receives a plurality of pixel components (block 805). Next, the compressor module compresses the block of pixel data into a compressed block of data (block 810). In one embodiment, the compressor module utilizes delta color compression (DCC) to compress the block of data.

If the size of the compressed block of data is greater than a threshold (conditional block 815, "yes" leg), then the compressor module discards the compressed block of data (block 820). Next, the plurality of original pixel components are packed together to eliminate the unused bits in the containers (block 825). Then, the compressor module stores the packed pixel components (block 830). In one embodiment, only a certain amount of space is allocated for storing a compressed block of data. In this embodiment, the value of the threshold can be set equal to the size of the memory footprint which is allocated for a compressed block of data. In one embodiment, there are 256 bytes of received pixel components and the threshold is 192 bytes. For example, in this embodiment, 192 bytes can be the amount of space allocated for storing a compressed block of data. In other embodiments, the size of the received pixel components and/or the threshold can be other numbers of bytes. If the size of the compressed group of data is less than or equal to the threshold (conditional block 815, "no" leg), then the compressor module stores the compressed block of data (block 835). After blocks 830 and 835, method 800 ends.

Figure 9:
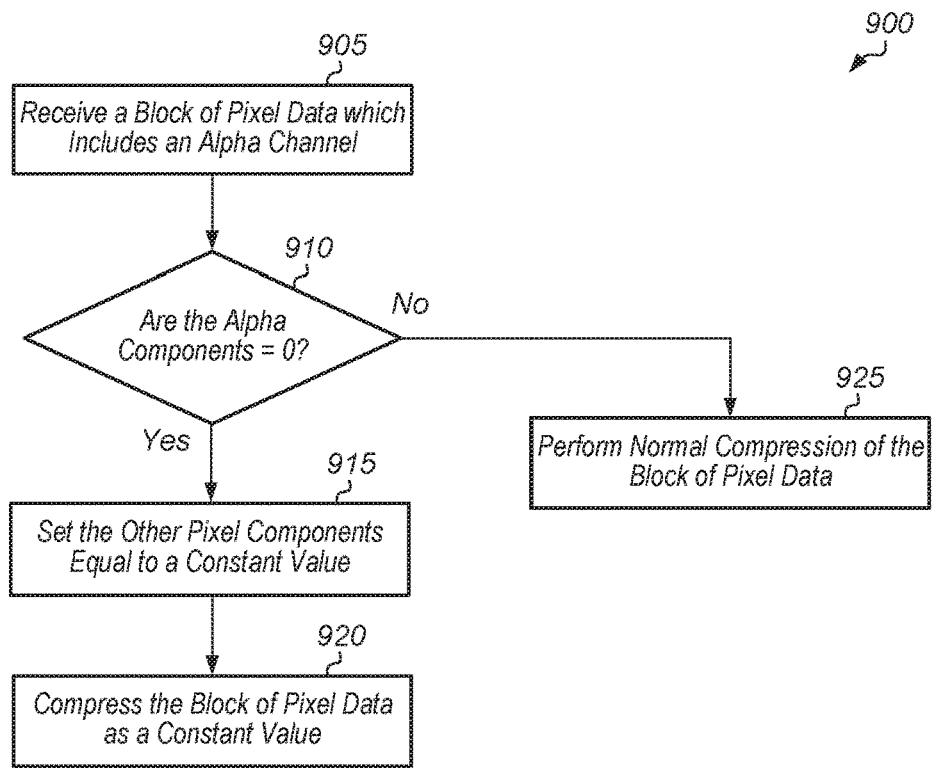
FIG. 9 is a generalized flow diagram illustrating another embodiment of a method for compressing pixel data with an alpha channel.

Referring now to FIG. 9, one embodiment of a method 900 for compressing pixel data with an alpha channel is shown. A compression module receives a block of pixel data which includes an alpha channel (block 905). If the alpha components of the block of pixel data are equal to zero (conditional block 910, "yes" leg), then the other pixel components are set equal to a constant value (block 915). For example, in one embodiment, the other pixel components are set to a predefined value. In one embodiment, the other pixel components are set to 0. In other embodiments, the other pixel components are set to any of various other constant values. Next, the block of pixel data is compressed as a constant value (block 920). Compressing the block of pixel data as a constant value can help to increase the amount of compression that is attained. Otherwise, if the alpha components of the block of pixel data are not equal to zero (conditional block 910, "no" leg), then the compression module performs normal compression of the block of pixel data (block 925). After blocks 920 and 925, method 900 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a memory subsystem;
    a processor coupled to the memory subsystem;
    wherein the processor is configured to:
        receive a plurality of M-bit pixel components comprising pixel data which are most significant bit (MSB) aligned in N-bit containers, wherein N and M are integers, N is greater than M, and only the M most significant bits of the N-bit containers store pixel data;
        shift the M-bit pixel components down into least significant bits (LSB) locations of the N-bit containers;
        convert the plurality of N-bit containers into a plurality of M-bit containers;
        compress the plurality of M-bit containers to create a compressed block of pixel data; and
        store the compressed block of pixel data in the memory subsystem.

2. The system as recited in claim 1, wherein the processor is configured to:
    determine if pixel data in the plurality of M-bit containers is equal to a constant value; and
    discard the pixel data and generate a metadata key specifying that a constant value has been detected responsive to determining that the pixel data in the plurality of M-bit containers is equal to a constant value.

3. The system as recited in claim 2, wherein the processor is configured to:
    determine if the pixel data in the plurality of M-bit containers is equal to either an encoding value of black or an encoding value of white;
    generate a first metadata key specifying that the pixel data includes all black pixels responsive to determining the pixel data in the plurality of M-bit containers is equal to the encoding value of black; and
    generate a second metadata key specifying that the pixel data includes all white pixels responsive to determining the pixel data in the plurality of M-bit containers is equal to the encoding value of white.

4. The system as recited in claim 1, wherein responsive to receiving a request to decompress the compressed block of pixel data stored in the memory subsystem, the processor is configured to:
    retrieve the compressed block of pixel data from the memory subsystem;
    decompress the compressed block of pixel data to create pixel components in M-bit containers;
    expand the M-bit containers into N-bit containers; and
    shift the pixel components to MSB locations of the N-bit containers.

5. The system as recited in claim 4, wherein the processor is further configured to convey the pixel components in the MSB locations of the N-bit containers to a client.

6. The system as recited in claim 1, wherein the processor is further configured to:
    determine if the compressed block of pixel data is greater than a threshold; and
    discard the compressed block of pixel data responsive to determining the compressed block of pixel data is greater than the threshold.

7. The system as recited in claim 6, wherein the processor is further configured to cause the plurality of M-bit pixel components to be packed together responsive to determining the compressed block of pixel data is greater than the threshold.

8. A method comprising:
    receiving a plurality of M-bit pixel components which are most significant bit (MSB) aligned in N-bit containers, wherein N and M are integers, N is greater than M, and only the M most significant bits of the N-bit containers store pixel data;
    shifting the M-bit pixel components down into least significant bits (LSB) locations of the N-bit containers;
    converting the plurality of N-bit containers into a plurality of M-bit containers;
    compressing the plurality of M-bit containers to create a compressed block of pixel data; and
    storing the compressed block of pixel data in a memory subsystem.

9. The method as recited in claim 8, further comprising:
    determining if pixel data in the plurality of M-bit containers is equal to a constant value; and
    discarding the pixel data and generating a metadata key specifying that a constant value has been detected responsive to determining that the pixel data in the plurality of M-bit containers is equal to a constant value.

10. The method as recited in claim 9, further comprising:
    determining if the pixel data in the plurality of M-bit containers is equal to either an encoding value of black or an encoding value of white;

generating a first metadata key specifying that the pixel data includes all black pixels responsive to determining the pixel data in the plurality of M-bit containers is equal to the encoding value of black; and generating a second metadata key specifying that the pixel data includes all white pixels responsive to determining the pixel data in the plurality of M-bit containers is equal to the encoding value of white.

11. The method as recited in claim 8, responsive to receiving a request to decompress the compressed block of pixel data stored in the memory subsystem, the method further comprising:

retrieving the compressed block of pixel data from the memory subsystem;

decompressing the compressed block of pixel data to create pixel components in M-bit containers;

expanding the M-bit containers into N-bit containers; and shifting the pixel components to MSB locations of the N-bit containers.

12. The method as recited in claim 11, further comprising conveying the pixel components in the MSB locations of the N-bit containers to a client.

13. The method as recited in claim 8, further comprising:

determining if the compressed block of pixel data is greater than a threshold; and discarding the compressed block of pixel data responsive to determining the compressed block of pixel data is greater than the threshold.

14. The method as recited in claim 13, further comprising causing the plurality of M-bit pixel components to be packed together responsive to determining the compressed block of pixel data is greater than the threshold.

15. An apparatus comprising:

a memory subsystem; and a compressor;

wherein the compressor is configured to:

receive a plurality of M-bit pixel components which are most significant bit (MSB) aligned in N-bit containers, wherein N and M are integers, and N is greater than M and only the M most significant bits of the N-bit containers store pixel data;

shift the M-bit pixel components down into least significant bits (LSB) locations of the N-bit containers;

convert the plurality of N-bit containers into a plurality of M-bit containers;

compress the plurality of M-bit containers to create a compressed block of pixel data; and store the compressed block of pixel data in the memory subsystem.

16. The apparatus as recited in claim 15, wherein the compressor is configured to:

determine if pixel data in the plurality of M-bit containers is equal to a constant value; and discard the pixel data and generate a metadata key specifying that a constant value has been detected responsive to determining that the pixel data in the plurality of M-bit containers is equal to a constant value.

17. The apparatus as recited in claim 16, wherein the compressor is configured to:

determine if the pixel data in the plurality of M-bit containers is equal to either an encoding value of black or an encoding value of white;

generate a first metadata key specifying that the pixel data includes all black pixels responsive to determining the pixel data in the plurality of M-bit containers is equal to the encoding value of black; and generate a second metadata key specifying that the pixel data includes all white pixels responsive to determining the pixel data in the plurality of M-bit containers is equal to the encoding value of white.

18. The apparatus as recited in claim 15, wherein responsive to receiving a request to decompress the compressed block of pixel data stored in the memory subsystem, the compressor is configured to:

retrieve the compressed block of pixel data from the memory subsystem;

decompress the compressed block of pixel data to create pixel components in M-bit containers;

expand the M-bit containers into N-bit containers; and shift the pixel components to MSB locations of the N-bit containers.

19. The apparatus as recited in claim 18, wherein the compressor is further configured to convey the pixel components in the MSB locations of the N-bit containers to a client.

20. The apparatus as recited in claim 15, wherein the compressor is further configured to:

determine if the compressed block of pixel data is greater than a threshold; and discard the compressed block of pixel data responsive to determining the compressed block of pixel data is greater than the threshold.

* * * * *